US007636355B2

(12) United States Patent
Koistinen et al.

(10) Patent No.: US 7,636,355 B2
(45) Date of Patent: Dec. 22, 2009

(54) SHARING OF PROTOCOL PROCESSING

(75) Inventors: Tommi Koistinen, Espoo (FI); Johan Haeggström, Helsinki (FI)

(73) Assignee: Nokia Corporation, Espoo (FI)

( * ) Notice: Subject to any disclaimer, the term of this patent is extended or adjusted under 35 U.S.C. 154(b) by 623 days.

(21) Appl. No.: 10/380,331

(22) PCT Filed: Aug. 13, 2001

(86) PCT No.: PCT/FI01/00710

§ 371 (c)(1), (2), (4) Date: Aug. 19, 2003

(87) PCT Pub. No.: WO02/23862

PCT Pub. Date: Mar. 21, 2002

(65) Prior Publication Data

US 2004/0028033 A1 Feb. 12, 2004

(30) Foreign Application Priority Data

Sep. 14, 2000 (FI) .................................. 20002025

(51) Int. Cl.
*H04L 12/56* (2006.01)
(52) U.S. Cl. ...................................... 370/392; 370/401
(58) Field of Classification Search ................. 370/351, 370/360, 352, 401, 389, 392, 465, 400, 402, 370/409; 709/250, 223–225, 238–244
See application file for complete search history.

(56) References Cited

U.S. PATENT DOCUMENTS

| | | | |
|---|---|---|---|
| 5,852,724 A | 12/1998 | Glenn, II et al. | |
| 5,943,481 A | 8/1999 | Wakeland | |
| 6,006,264 A * | 12/1999 | Colby et al. | 709/226 |
| 6,011,803 A * | 1/2000 | Bicknell et al. | 370/467 |
| 6,128,298 A * | 10/2000 | Wootton et al. | 370/392 |
| 6,683,885 B1 * | 1/2004 | Sugai et al. | 709/238 |
| 2001/0037406 A1 | 11/2001 | Philbrick et al. | |
| 2003/0200341 A1 * | 10/2003 | Lynch et al. | 709/250 |
| 2004/0117509 A1 * | 6/2004 | Craft et al. | 709/250 |
| 2004/0202184 A1 * | 10/2004 | Yazaki et al. | 370/395.31 |
| 2006/0029038 A1 * | 2/2006 | Jungck | 370/398 |

FOREIGN PATENT DOCUMENTS

| | | |
|---|---|---|
| EP | 0 942 554 A2 | 9/1999 |
| EP | 1 009 133 A2 | 6/2000 |
| EP | 1 059 790 A2 | 12/2000 |
| WO | WO 99/22353 | 5/1999 |
| WO | WO 00/27164 | 5/2000 |

* cited by examiner

*Primary Examiner*—Ricky Ngo
*Assistant Examiner*—Pao Sinkantarakorn
(74) *Attorney, Agent, or Firm*—Mintz, Levin, Cohn, Ferris, Glovsky, and Popeo, P.C.

(57) ABSTRACT

An arrangement of a network element, which routes communication traffic among different types of communication networks, includes a central processing unit configured to perform routing operations on the basis of a communication protocol, which forms a stack. Also, the arrangement of the network element includes devices configured to handle signal processing related issues and communicating with the central processing unit. The communication protocol stack is divided into a first stack situated in the central processing unit, which performs the routing operations of protocols in the first stack, and into a second stack, each device that handles signal processing related issues performing the operations of protocols in the second stack.

5 Claims, 3 Drawing Sheets

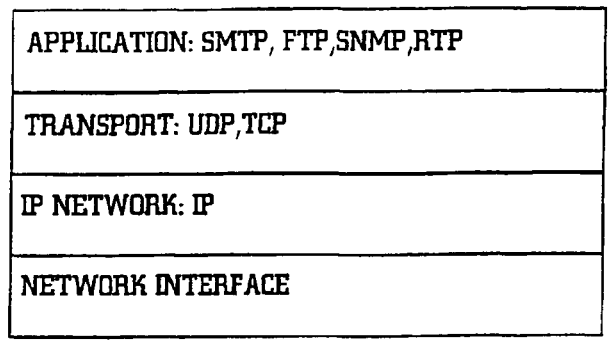
PRIOR ART    FIG. 1
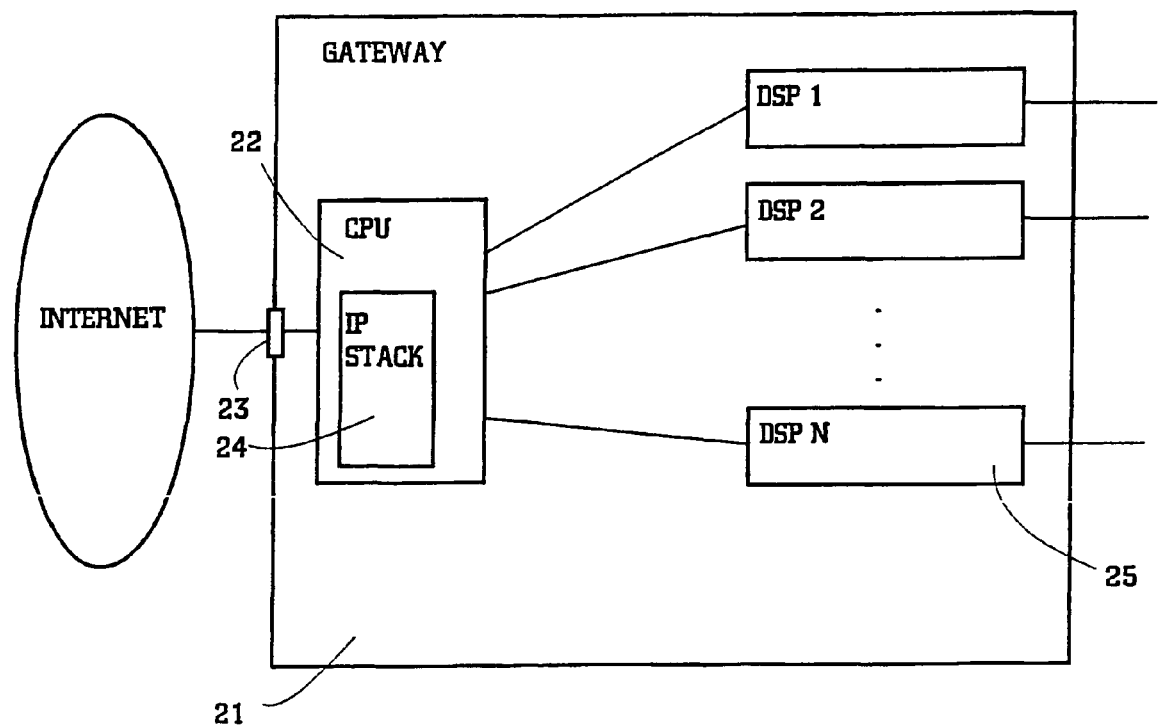
PRIOR ART    FIG. 2

SHARING OF PROTOCOL PROCESSING

FIELD OF THE INVENTION

This invention relates to protocol processing in a network element. In particular, this invention relates to the protocol processing in a network element, called media gateway (MGW), which transfers communication channels among different types of communication networks.

BACKGROUND OF THE INVENTION

It is convenient to divide the tasks of a communication network into several parts. Certain rules must be followed to achieve those tasks. A format and a set of rules are called a protocol. There exist several different protocols in communication networks. Correspondingly, the tasks of a network element are divided into several parts.

FIG. 1 shows how TCP/IP protocols work together using a layering model. First, the tasks are divided into four layers, called Application, Transport, IP network and Network Interface layers. The Application layer contains application programs that users invoke. The programs access services available across the Internet, and interact with one of the protocols in the Transport layer to send or receive data. Usually, the application programs use certain protocols, such as SMTP (Simple Mail Transfer Protocol), FTP (File Transfer Protocol), SNMP (Simple Network Monitoring Protocol) and RTP (Real Time Transport Protocol) to interact with the protocols in the Transport layers.

The Transport layer provides communication between a pair of application programs, the one in a local network element and the other in a remote network element. Such communication is often called end-to-end. Transport protocol software may provide reliable transport, ensuring that data arrives without errors and in sequence. The transport protocol software divides the data stream being transmitted into packets and passes each packet along with a destination address to the IP network layer. The most common transport protocols are UDP (User Datagram Protocol) and TCP (Transmission Control Protocol).

The IP network layer handles communication from one network element to another element. It accepts a request to send a packet from the Transport layer with an indentification of the network element to which the packet should be sent. The IP network layer encapsulates the packet in an IP datagram, decides where the datagram should be sent and passes the datagram to the appropriate network interface for transmission. The IP network layer also handles incoming datagrams, checking their validity and deciding whether the datagram should be processed locally or forwarded to another network element. The protocol used in this layer is IP (Internet Protocol).

The network interface layer comprises interface software which handles accepting IP datagrams and transmitting them over a specific network. A communication network uses network specific frames to carry IP datagrams, so the network interface layer handles the packing and depacking of IP datagrams into and out from network frames.

FIG. 2 illustrates an example of a network element (21), called a gateway. A gateway transfers communication channels among different types of communication networks, in FIG. 2 IP traffic from the Internet to PSTN traffic in TDM (time-division multiplexing) networks and vice versa. The CPU (central processor unit) (22) contains a MAC (Media Access Control) interface for a physical Internet interface (23) (MAC refers to the low-level hardware protocols used to access a certain network). The CPU also contains an Internet protocol stack (24) (Refer to FIG. 1). This is a typical situation in VoIP (Voice over IP) implementations.

The gateway also contain several DSP's (digital signal processors) (25) which convert the IP traffic format to a traffic format used in a TDM network, such as PCM (Pulse Code Modulation) and vice versa. A DSP is a modified fast real-time processor for a specific signaling processing purpose.

Normally the IP stack (24) handles the task of the Network Interface layer, IP network layer and Transport layer. Because a gateway usually contains only one CPU and channels from several DSP's load it, the CPU forms a capacity bottleneck. The intention of the invention is to alleviate this drawback. This is achieved in a way described in the claims.

SUMMARY OF THE INVENTION

The idea of the invention is to divide an IP protocol stack between a CPU and several DSP's in a network element. Because the CPU contains a MAC-interface for an Internet interface and it routes IP traffic to the right DSP, a certain part of the IP protocol stack must be handled in the CPU. The rest of the IP protocol is handled by each DSP. In this way, it is possible to share the processing of the IP stack among several processors.

BRIEF DESCRIPTION OF THE DRAWINGS

In the following the invention is described in more detail by means of FIGS. 1-3 in the attached drawings where, FIG. 1 illustrates an example of network layers in the Internet, FIG. 2 illustrates an example of a gateway between the Internet and TDM networks.

DETAILED DESCRIPTION OF THE INVENTION

Figure 3:
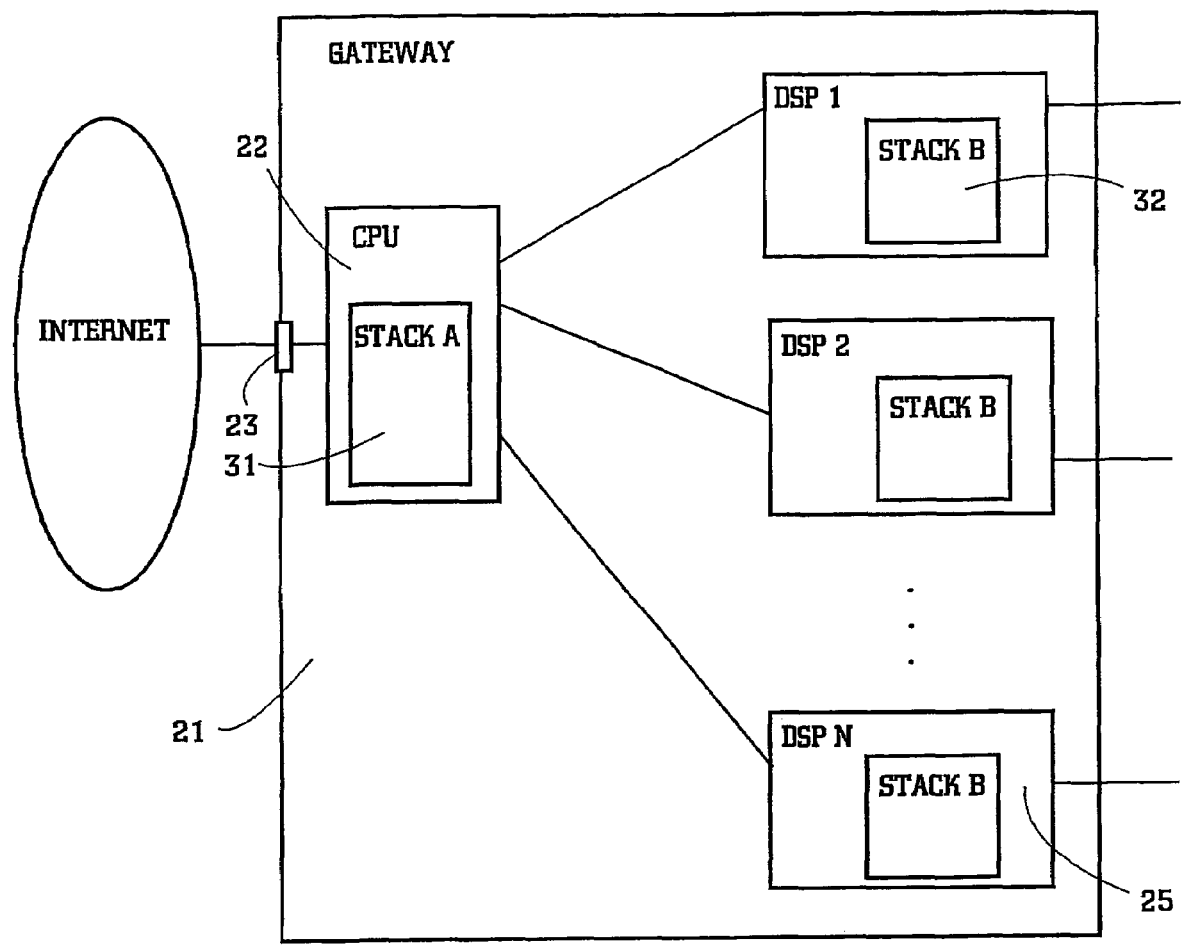
FIG. 3 illustrates an example of an inventive arrangement.

FIG. 3 shows an example of the arrangement according to the invention. The whole IP stack is normally handled in the CPU (22). A CPU consumes more power and circuit board area than a DSP. But a CPU also contains more memory and capacity than a DSP. The normal situation is that one CPU forms an interface for the Internet and handles the IP protocol stack. The CPU also routes traffic from the Internet to several DSP's, and vice versa. A normal architecture can, for example, be one CPU and ten DSP's. This kind of architecture loads the CPU while the DSP's may contain free capacity. In the invention the IP protocol stack is divided into two stacks: stack A (31) in the CPU and stack B (32) in each DSP (25) in FIG. 3 for sharing the load of the IP stack processing.

The division of the IP stack makes it possible to avoid the situation where the CPU is a capacity bottleneck. It may, for example, be that the CPU handles the maximum number of channels while only one third of the channel capacity is in use in the DSP's, thus causing a capacity bottleneck. An easy way to solve this problem is to increase the number of CPU's or decrease the number of DSP's, but both these would end in a non-optimal solution.

Because the CPU has an MAC-interface for the physical Internet interface (23), IP protocols used in hardware (Refer to the Network Interface layer in FIG. 1) have to be in stack A. The rest of the IP stack can be in stack B, i.e. the protocols (such as IP, UDP, TCP) of the IP network layer and the Transport layer. Usually, application protocols are situated in an endpoint element, but it may also be possible to situate some application protocols in stack B.

Figure 4:
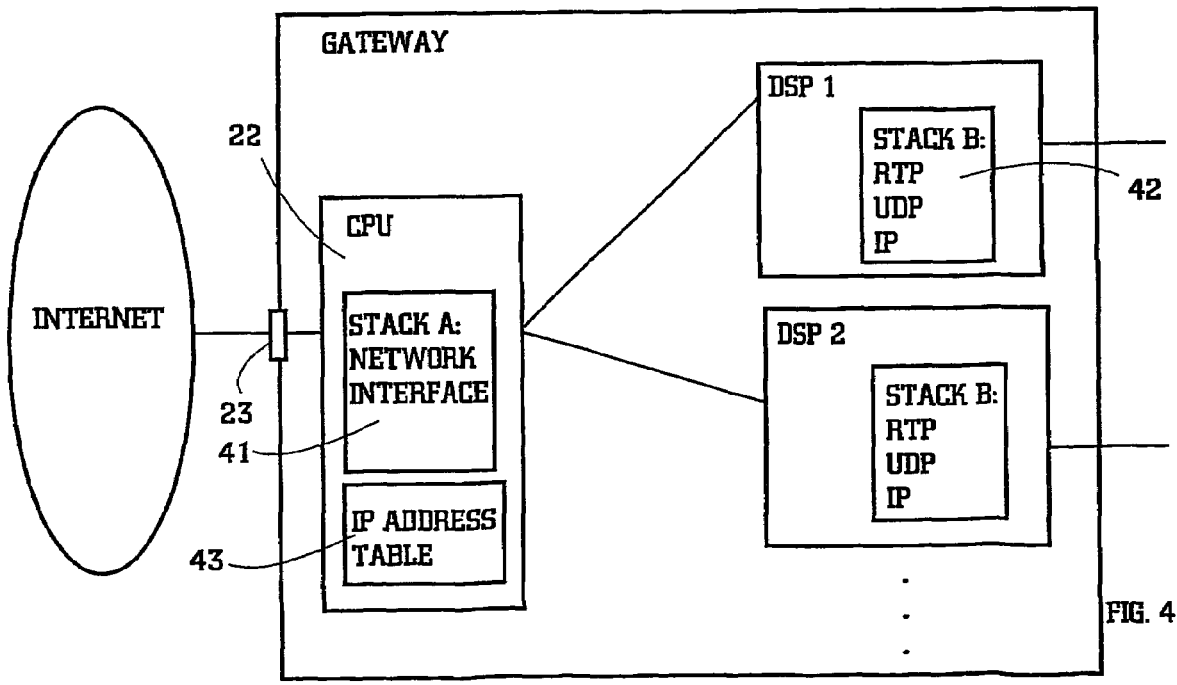
FIG. 4 illustrates an example of how to divide the IP stack and to route channels based on IP addresses.

Normally, it is the IP protocol in the CPU that routes the incoming IP traffic from the Internet to the right destination through the right DSP, but in the inventive arrangement there must be another solution because DSP's contain the IP protocol. In the invention each DSP preferably has its own identification code inside the IP address field of the IP datagram. In other words, each DSP forms a subnetwork, which has its own network address. FIG. 4 illustrates an example of this situation. A simple routing table (43) must be in the CPU for checking to which DSP an incoming traffic is routed. After receiving (41) and routing the incoming traffic, the CPU sends it to the right DSP that disassembles the traffic in the stack B (42), before transmitting the user data traffic to the TDM network.

Figure 5:
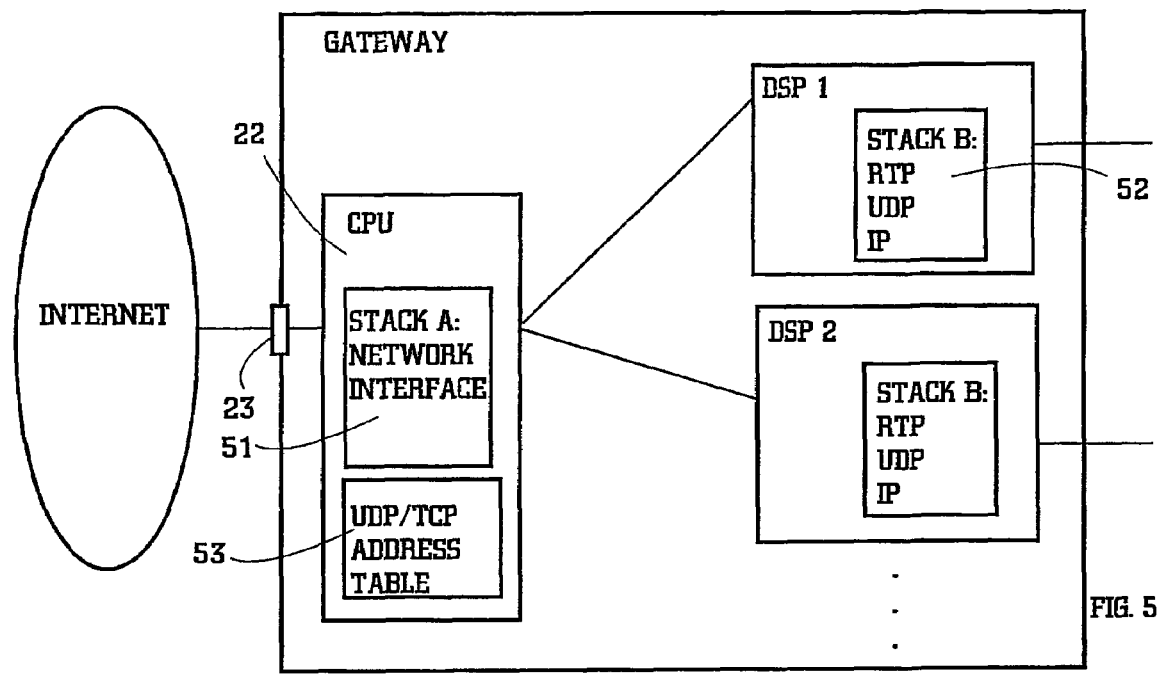
FIG. 5 illustrates an example of how to divide the IP stack and to route channels based on UDP or TCP port numbers.

Other solutions for addressing the traffic to the right DSP are to use UDP (User Datagram Protocol) or TCP port numbers. However, the use of these choices strongly depends on the size of the TDM networks behind the DSP's. An UDP or TCP port number usually identifies a protocol port (a destination point) for a specific application, such as FTP or SMTP. If the UDP or TCP port number are used for routing traffic in a gateway, the CPU may have only one IP address (This can be a desired feature.), which is the same for all DSP's. The separation of the transport channels is based on the UDP/TCP port numbers. FIG. 5 shows an example of this solution wherein Stack A (51) contains the network interface protocol used, and Stack B (52) RTP (or another application protocol), UDP (or TCP) and IP protocols. Using UDP/TCP port numbers, the CPU requires a routing table (53) wherein each port number is mapped into a data bus between the CPU and the DSP's. Each DSP can pick the right slot containing the right traffic from the data bus inside the gateway.

Figure 6:
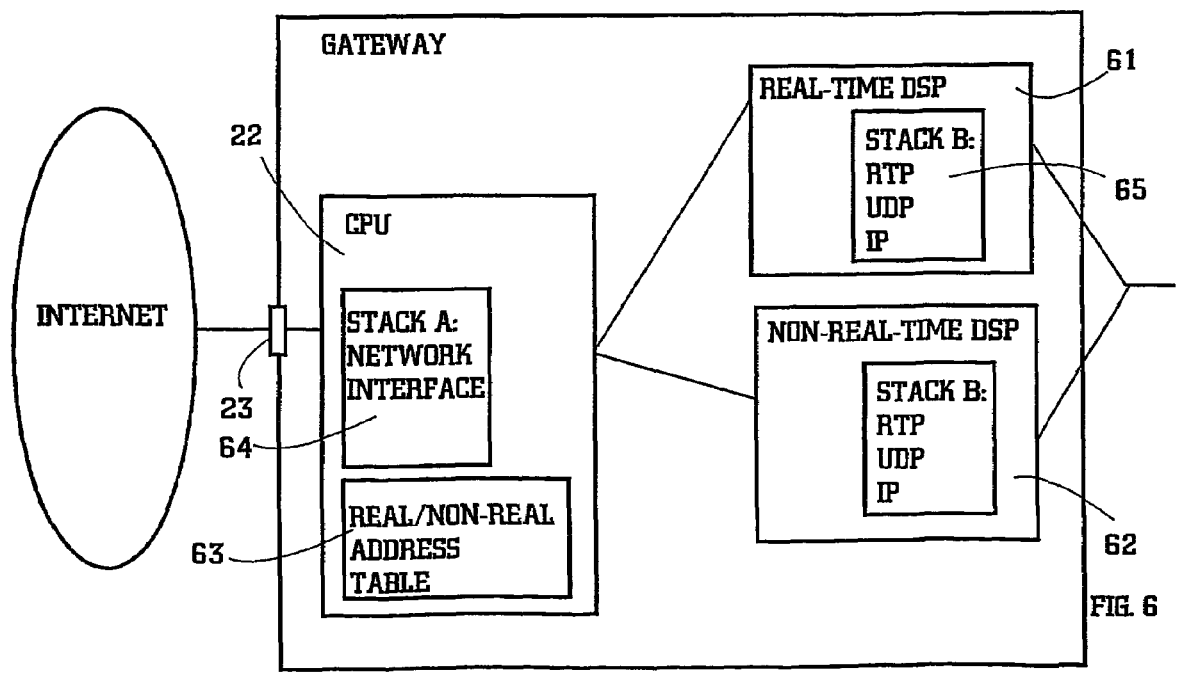
FIG. 6 illustrates an example of how to divide channels among DSP's based on real-time traffic demands.

It is also possible to use the separation of real-time or non-real-time traffic for routing. See FIG. 6. In this solution the real-time traffic is handled in its own DSP (61) (or DSP's) and the non-real-time traffic in the other DSP (62). The CPU must have a simple routing table allocating the real-time and non-real-time traffic to the right DSP (63). In this way the real-time requirements can be guaranteed using the dedicated DSP. Dedicated DSP's make it possible to use memory efficiently because the processing is the same for all channels. In the IP protocol version Ipv4, the header of IP datagram contains a field for Type of Service (TOSS). It is possible to identify the real-time traffic (low delay) and the non-real-time traffic by using this field. In the IP protocol Ipv6 and in the Diffuser framework are corresponding fields to identify the real-time traffic and the non-real-time traffic, i.e. The quality of service (QoS). QoS also includes other criteria for the quality of service, such as high throughput or high reliability which can also be used for routing purposes, if desired. It is worth noticing that in this case QoS indentifications identify through which DSP a single channel goes. In the case of FIG. 6, Stack A (64) contains the network interface protocol used, and Stack B (65) RTP (or another application protocol), UDP (or TCP) and IP protocols.

It is also possible to use the RTP (Real-time Transport Protocol) for the routing in the CPU. The RTP protocol contains a payload type field, which can be a criterion for routing traffic to the right DSP handling a certain type of traffic.

To sum up, the routing operation in a CPU can be handled using an IP-address, the TOSS field in an IP datagram, the TCP port number in the TCP protocol, the UDP port number in the UDP protocol or the payload type field in the RTP protocol. In every case, there exists a routing table in the CPU.

Correspondingly the out coming traffic from the TDM networks are assembled in the stacks B for forming IP datagrams, for sending to the Internet through the CPU. The CPU does not have to check IP addresses before sending them to the Internet.

If the user data streams consist of UDP traffic, the CPU handles interface protocols and the DSP's handle the rest of the protocols in the Transport layer and IP network layer. If the user data streams consist of TCP traffic the operations of the whole IP stack may have to be performed in the CPU. The reason for this is that the processing of the TCP protocol requires much memory and DSP's are usually memory restricted. But if enough memory exits in the DSP's, there are no obstacles to use the inventive sharing of IP stack among many processors.

An IP stack can be divided into two parts in many ways. One way was described above. Another way is that IP interface protocols and an IP protocol form together the stack in a CPU, and a protocol in the Transport layer and maybe some application protocols form the stack in a DSP. Anyway, when dividing the processing of the whole IP stack among several processors, cooperation must be taken into account, which is not always easy to achieve. It may be confusing when the operations of a part of the IP stack are performed in one processor and the other part in another processor.

The invention offers an arrangement to avoid the situation where a capacity bottleneck is going to develop in a CPU. The capacity of DSP's can be used more optimally than present solutions. The invention can be implemented in many ways, in the scope of the inventive idea.

The invention claimed is:

1. An apparatus, comprising:
a central processing unit configured to perform routing operations on the basis of a communication protocol stack, and
at least two devices configured to handle signal processing related issues,
wherein the communication protocol stack is divided into a first stack and a second stack, the first stack being situated in the central processing unit, wherein the central processing unit is configured to perform the routing operations of protocols in the first stack, and wherein the at least two devices are configured to perform the operations of protocols in the second stack, and wherein the central processing unit comprises a routing table comprising routing information configured to allow routing datagrams between the central processing unit and the at least one two devices, wherein each datagram comprising an identification code of one of the devices inside an internet protocol address field of the datagram, wherein the routing operations of protocols in the first stack comprise determining a respective one of the at least two devices to which each datagram is to be sent based on the identification code of the datagram and the routing information, wherein the communication protocol stack comprises an internet protocol stack, and
wherein the first stack comprises interface protocols configured to map between internet protocol datagrams and network specific frames, and the second stack comprises internet protocol and at least one of user datagram protocol, transmission control protocol, application protocols and time transport protocol.

2. An apparatus, comprising:
a central processing unit configured to perform routine operations on the basis of a communication protocol stack, and
at least two devices configured to handle signal processing related issues,
wherein the communication protocol stack is divided into a first stack and a second stack, the first stack being situated in the central processing unit, wherein the central processing unit is configured to perform the routing operations of protocols in the first stack, and wherein the at least two devices are configured to perform the operations of protocols in the second stack, and wherein the central processing unit comprises a routing table comprising routing information configured to allow routing datagrams between the central processing unit and the at least one two devices, wherein each datagram comprising an identification code of one of the devices inside an internet protocol address field of the datagram, wherein the routing operations of protocols in the first stack comprise determining a respective one of the at least two devices to which each datagram is to be sent based on the identification code of the datagram and the routing information, wherein the communication protocol stack comprises an internet protocol stack, and
wherein the first stack comprises interface protocols configured to map between internet protocol datagrams and network specific frames and internet protocol, and the second stack comprises at least one of user datagram protocol, transmission control protocol, application protocols and time transport protocol.

3. An apparatus, comprising:
a central processing unit configured to perform routing operations on the basis of a communication protocol stack, and
at least two devices configured to handle signal processing related issues,
wherein the communication protocol stack is divided into a first stack and a second stack, the first stack being situated in the central processing unit, wherein the central processing unit is configured to perform the routing operations of protocols in the first stack, and wherein the at least two devices are configured to perform the operations of protocols in the second stack, and wherein the central processing unit comprises a routing table comprising routing information configured to allow routing datagrams between the central processing unit and the at least one two devices, wherein each datagram comprising an identification code of one of the devices inside an internet protocol address field of the datagram, wherein the routing operations of protocols in the first stack comprise determining a respective one of the at least two devices to which each datagram is to be sent based on the identification code of the datagram and the routing information, wherein the communication protocol stack comprises an internet protocol stack, and
wherein the central processing unit comprises a routing table which comprises at least one of internet protocol address information, user datagram protocol port number information, transmission control protocol port number information, real time transport protocol payload type information, and real-time requirement information, said routing table being configured to route the communication traffic between the central processing unit and the at least two devices that handle signal processing related issues.

4. A method, comprising:
performing, at a central processing unit, routing operations on datagrams on the basis of a communication protocol stack, the central processing unit comprising a routing table comprising routing information configured to allow routing of datagrams between the central processing unit and at least two devices configured to handle signal processing related issues, wherein each datagram comprises an identification code of a one of said devices inside an internet protocol address field of the datagram, and wherein the communication protocol stack is divided into a first stack and a second stack, the first stack being situated in the central processing unit and the at least two devices being configured to perform the operations of protocols in the second stack, wherein the performing at the central processing unit comprises
performing the routing operations of protocols in the first stack, and
determining a respective one of the devices to which each datagram is to be sent based on the identification code and the routing information, wherein the communication protocol stack comprises an internet protocol stack, and
wherein the first stack comprises interface protocols configured to map between internet protocol datagrams and network specific frames, and the second stack comprises at least one of internet protocol, user datagram protocol, transmission control protocol, application protocols and time transport protocol.

5. A method, comprising:
performing, at a central processing unit, routine operations on datagrams on the basis of a communication protocol stack, the central processing unit comprising a routing table comprising routine information configured to allow routing of datagrams between the central processing unit and at least two devices configured to handle signal processing related issues, wherein each datagram comprises an identification code of a one of said devices inside an internet protocol address field of the datagram, and wherein the communication protocol stack is divided into a first stack and a second stack, the first stack being situated in the central processing unit and the at least two devices being configured to perform the operations of protocols in the second stack, wherein the performing at the central processing unit comprises
performing the routing operations of protocols in the first stack, and
determining a respective one of the devices to which each datagram is to be sent based on the identification code and the routing information, wherein the communication protocol stack comprises an internet protocol stack, and
wherein the central processing unit comprises a routing table configured to store at least one of user datagram protocol port number information, transmission control protocol port number information, real time transport protocol payload type information, real time requirement information, and internet protocol address information, and said central processing unit is configured to route the communication traffic between the central processing unit and the at least two devices that handle signal processing related issues.

* * * * *

UNITED STATES PATENT AND TRADEMARK OFFICE
CERTIFICATE OF CORRECTION

| | |
|---|---|
| PATENT NO. | : 7,636,355 B2 |
| APPLICATION NO. | : 10/380331 |
| DATED | : December 22, 2009 |
| INVENTOR(S) | : Koistinen et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 944 days.

Signed and Sealed this

Twenty-first Day of December, 2010

David J. Kappos
*Director of the United States Patent and Trademark Office*